United States Patent Office 3,555,050
Patented Jan. 12, 1971

3,555,050
CYCLOALIPHATIC COMPOUNDS
Ralph F. Sellers, Somerset, Samuel G. Smith, Jr., Hillsborough Township, and Allison S. Burhans, Millington, N.J., assignors to Union Carbide Corporation, a corporation of New York
No Drawing. Filed Oct. 26, 1966, Ser. No. 589,507
Int. Cl. C07d 1/00
U.S. Cl. 260—348    2 Claims

ABSTRACT OF THE DISCLOSURE

The disclosure of this application is directed to cycloaliphatic epoxides, specifically di-2,4(2,3-epoxycyclopentyl)anisole and tri - 2,4,6(2,3-epoxycyclopentyl)anisole, which can be admixed with epoxide curing agents such as polyfunctional amines to form compositions which have excellent storage life and can be formed into castings or used as binders in structural laminates and cured to infusible products characterized by excellent properties.

This invention relates to cycloaliphatic benzene compounds and polyepoxides derived therefrom. More particularly, this invention relates to polyepoxides which can be readily compounded with other materials to provide compositions of desired formulation having good storage life and from which cured products can be obtained having excellent physical, chemical and electrical properties.

Polyepoxide compositions, such as those which are based on polyglycidylethers of polyhydric phenols, generally contain a polyfunctional amine as the curing agent as these compositions will cure to infusible products which are characterized by excellent physical, chemical and electrical properties. The polyglycidylethers of polyhydric phenols are usually admixed with a measured amount of a polyfunctional amine ranging from about 90 percent of stoichiometric to about 10 percent in excess of stoichiometric and the compositions utilized as desired, for example, as casting compositions and as coatings using conventional coating techniques such as brushing or spraying.

In view of the relatively high reactivity of the polyfunctional amines with polyglycidylethers, the curing reaction involving the polyglycidylethers and the polyfunctional amines commences immediately upon admixing of the two materials. As a result, polyepoxide compositions containing the polyfunctional amines, "fast cure," that is, these compositions cure to the infusible state in a short period of time.

The problem of fast cure has presented many obvious difficulties since it is not always possible to utilize the polyepoxide compositions immediately upon formulation. In many instances, the polyepoxide compositions cure before they can be used in the desired manner.

Various suggestions have been made for the purpose of improving the relatively poor storage life of polyepoxide compositions. For example, it has been suggested to incorporate into these compositions an agent which is unreactive per se but which, under the impetus of heat, will become activated and react with the polyoxide with the result that the compositions will cure to the infusible state. Latent acting compounds, particularly of the type described, have proved to be undesirable because of the uncertainty and unpredictability of the "activation" reaction. As an illustration, a variation in the amount of heat imparted to the compositions during the activation cycle can seriously affect the extent to which the reaction proceeds and consequently the amount of activated material which is formed.

The present invention provides for cycloaliphatic compounds which can be epoxidized to compounds which can be admixed with curing agents, including polyfunctional amines, to form compositions which have excellent storage life but when used in the desired manner, as for example, as castings or as binders in structural laminates will cure to infusible products, generally when heated, which are characterized by excellent properties.

The cycloaliphatic compounds and epoxide derivatives thereof can be represented structurally by Formulas I–VI which are set forth below.

Formula I

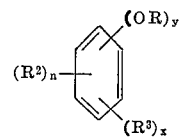

wherein R is a monovalent hydrocarbon radical generally containing a maximum of 18 carbon atoms and preferably containing a maximum of 2 carbon atoms, $R^2$ is an olefinic unsaturated cycloaliphatic radical having a maximum of 2 unsaturated groups, generally containing a maximum of 18 carbon atoms and preferably containing a maximum of 5 carbon atoms, $R^3$ is an alkyl radical generally containing a maximum of 18 carbon atoms and preferably containing a maximum of 4 carbon atoms or halogen, i.e., chlorine, bromine, iodine or fluorine or alkoxy generally containing a maximum of 18 carbon atoms and preferably containing a maximum of 4 carbon atoms, $n$ is an integer having a value of 2 to 3 inclusive, $x$ is an integer having a value of 0 to 3 inclusive, $y$ is an integer having a value of 1 to 3 inclusive and the maximum sum of $n+x+y=6$.

Particularly desirable compounds falling within the scope of Formula I are those having the formula:

Formula II

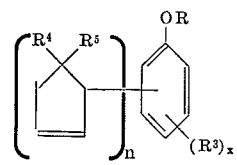

wherein R, $R^3$, $n$ and $x$ are as defined and the maximum sum of $n+x=5$ and $R^4$ and $R^5$ are hydrogen or alkyl and when alkyl generally containing a maximum of 8 carbon atoms and preferably containing a maximum of 2 carbon atoms.

Formula III

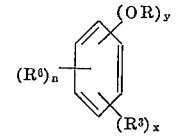

wherein R, $R^3$, $n$, $x$, $y$ and the maximum sum of $n+x+y$ are as defined in Formula I and $R^6$ is a cycloaliphatic radical as defined for $R^2$ wherein the unsaturated group or groups of $R^2$ have been epoxidized.

Particularly desirable compounds falling within the scope of Formula III are those having the formula:

Formula IV

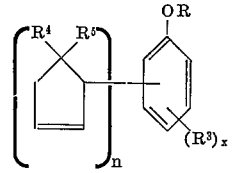

wherein R, $R^3$, $R^4$, $R^5$, $n$, $x$ and the maximum sum of $n$ and $x$ are as defined in Formula II.

Among suitable radicals for $R^2$ are cyclopentenyl, cyclohexenyl, cyclooctenyl, cyclooctadecenyl, cyclohexadienyl, cyclodecadienyl and the like as well as substituted derivatives thereof, as for example, alkyl substituted derivatives.

Illustrative of monovalent hydrocarbon radicals for R are the following: alkyl radicals, such as methyl, ethyl, n-propyl, n-butyl, n-hexyl, 2-ethyl-n-hexyl, n-octyl n-dodecyl and the like; cycloalkyl radicals, such as cyclohexyl and the like; unsaturated alkyl and cycloalkyl radicals, such as allyl, cyclopentenyl and the like; halogenated alkyl and cycloalkyl radicals, such as chloroethyl, bromoethyl, fluoroethyl, 2-chloro-n-propyl, 2-bromo-n-propyl, 2-chloro-n-butyl 3-chloro-n-amyl, 3-bromo-n-amyl, 2-chloro-n-hexyl, 2-chlorocyclohexyl and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl and the like; aralkyl radicals, such as benzyl, 2-phenyl ethyl, 3-phenyl-n-propyl, 1-phenyl-n-butyl, 1-phenyl-n-decosyl and the like; aryl radicals, such as phenyl, naphthyl and the like; halogenated aryl radicals, such as p-chlorophenyl, p-bromophenyl, p-fluorophenyl, p-iodophenyl, 2-chloronaphthyl, 2-bromonaphthyl and the like; alkoxy and aryloxy substituted aryl radicals, such as p-methoxyphenyl, p-ethoxyphenyl, p-phenoxyphenyl and the like; alkaryl radicals, such as o-methylphenyl, p-ethylphenyl, p-n-propylphenyl, o-n-propylphenyl, o-n-butylphenyl, p-n-dodecylphenyl, p(2-ethyl-n-hexyl) phenyl and the like; nitro substituted aryl radicals, such as p-nitrophenyl, 2-nitronaphthyl and the like; other suitable radicals inclue 2-hydroxyethyl and the like.

Exemplary of suitable alkyl and alkoxy radicals for $R^3$ are methyl, n-propyl, n-butyl, n-hexyl, 2-ethyl-n-hexyl and the like; methoxy, ethoxy, 2-ethyl-n-hexoxy and the like. Among suitable alkyl radicals for $R^4$ and $R^5$ are those enumerated for R.

Preparation of compounds falling within the scope of Formula I can be conveniently prepared by reacting an unsaturated cycloaliphatic compound, as for example, a compound having the formula:

Formula V

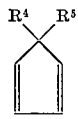

with a phenol having the formula:

Formula VI

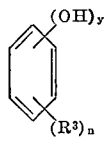

wherein $R^3$, $R^4$, $R^5$, $y$ and $n$ are as previously defined, in a manner as described in British Patent 741, 446 and also as described in a book by George A. Olah entitled "Friedel-Crafts and Reactions," Part I, Chapter XV, Interscience Publishers, 1964.

The compound which is obtained has the formula:

Formula VII

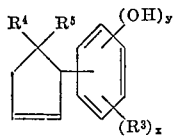

wherein all of the variables are as previously described.

The compound of Formula VII is then reacted with a compound having the formula:

(Formula VIII)

RX wherein R is as defined in Formula I and X is a halogen atom, i.e., chlorine, bromine, iodine or fluorine to obtain a compound defined by Formula I.

Exemplary of suitable phenols falling within the scope of Formula VI are: phenol, resorcinol, phloroglucinol, 4-ethylphenol, 4-chlorophenol, 4-methoxyphenol, 4-butyl resorcinol, and the like.

In conducting the reaction between a compound falling within the scope of Formula VII and a compound falling within the scope of Formula VIII it is customary to react about 0.1 mole to about 1 mole of a Formula VII compound per mole of a Formula VIII compound in the presence of an alkali metal hydroxide such as potassium hydroxide, sodium hydroxide and the like. As a rule, the alkali metal hydroxide is used in an amount of about 1 mole per mole of the Formula VIII compound.

This reaction is generally conducted at a temperature of about 25° C. to about 100° C. and preferably at a temperature of about 50° C. to about 65° C.

As a rule, the reactants are brought into intimate contact utilizing an organic diluent such as acetone, dimethyl sulfoxide and the like. Also, the reaction can be conducted under atmospheric, subatmospheric or superatmospheric pressures.

Epoxidation of the compounds obtained, which fall within the scope of Formula I, can be carried out as described in this application and also as described in U.S. Patent 2,750,395 to B. Phillips et al.

The polyepoxides of this invention can be cured to infusible products by being heated at elevated temperatures, generally on the order of about 50° C. to about 200° C. Since the self-cure of these polyepoxides, at elevated temperatures, usually requires more than a day, it is customary to add curing agents thereto, prior to the heating cycle, in order to effect a cure in a reasonable period of time. Any of the epoxy curing agents can be used for this purpose. The curing agents can be catalysts, that is, compounds which primarily catalyze the curing reaction, or hardeners, compounds which react with the epoxy groups.

Suitable hardeners are the polyamines (described in U.S. Patent 2,935,488) the polycarboxylic acids and anhydrides thereof (described in U.S. Patent 2,921,925 to B. Phillips et al.).

For purposes of stoichiometric calculations one epoxy group is deemed to react with one amino hydrogen atom; one epoxy group is deemed to react with one carboxyl group and one epoxy group is deemed to react with one anhydride group.

Particularly desirable hardeners for purposes of this invention are the aromatic amine hardeners. Among suitable aromatic amines are those having 2 or more and preferably at least 3 amino hydrogen atoms per molecule, as for example, those having the formula:

Formula IX

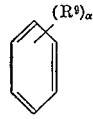

wherein each $R^9$, which can be the same or different, is halogen, e.g., chlorine, bromine and the like; primary amino groups; or hydrocarbon radicals, generally containing 1 to 20 carbon atoms inclusive and preferably containing 1 to 10 carbon atoms inclusive and $\alpha$ is a whole number having a value of 1 to 6 inclusive; provided the compound contains 2 or more amino hydrogen atoms per molecule.

Illustrative of hydrocarbon radicals for $R^9$ are alkyl radicals, generally containing 1 to 20 carbon atoms inclusive and preferably containing 1 to 10 carbon atoms inclusive such as methyl, ethyl, n-propyl, isopropyl, n-butyl, n-decyl and the like; cycloalkyl radicals, generally containing 3 to 20 carbon atoms inclusive and preferably containing 3 to 10 carbon atoms inclusive, such as cyclohexyl and the like; unsaturated alicyclic and unsaturated aliphatic hydrocarbon radicals, generally containing 2 to 20 carbon atoms inclusive and preferably containing 2 to 10 carbon atoms inclusive, such as cyclopentenyl, allyl and the like; halogenated alkyl and cycloalkyl radicals, generally containing 1 to 20 carbon atoms inclusive and preferably containing 1 to 10 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive such as methoxymethyl, ethoxyethyl, 3-ethoxy-n-propyl, 4-ethoxy-n-butyl, 2-methoxycyclohexyl, phenoxymethyl, 2-phenoxyethyl and the like; aryl radicals, generally containing 6 to 20 carbon atoms inclusive and preferably containing 6 to 18 carbon atoms inclusive, such as phenyl, tolyl and the like, as well as halogenated aryl radicals, such as p-chlorophenyl, p-bromophenyl, p-fluorophenyl, p-iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-phenoxyphenyl and the like; alkaryl radicals, such as o-methylphenyl, p-ethylphenyl, p-n-propylphenyl and the like; also, those hydrocarbon radicals, as described, which are substituted with one or more amino groups.

Exemplary of such aromatic amines are the following: o-phenylenediamine, p-phenylenediamine, m-phenylenediamine, benzidine, o-toluidine, o-dianisidine and the like.

Particularly desirable aromatic amines falling within the scope of Formula IX are those amines having the formula:

Formula X

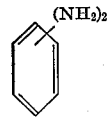

Among other suitable aromatic amines are those having the formula:

Formula XI

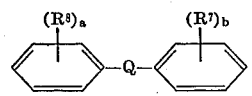

wherein $R^8$ and $R^7$ are as defined for $R^9$, $a$ and $b$ are whole numbers having a value of 1 to 5 inclusive and Q is a divalent radical, as for example,

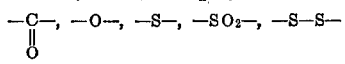

or a divalent hydrocarbon radical, wherein the amine contains at least two primary amino groups per molecule, as described, and these do not necessarily have to be attached to the same aromatic nucleus.

Illustrative of suitable divalent hydrocarbon radicals for Q are the following divalent, aliphatic hydrocarbon radicals: alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula XI are those aromatic amines having the formula:

FORMULA XII

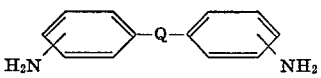

wherein Q is a sulfone ($SO_2$) or a divalent hydrocarbon radical, as previously described.

Also suitable for purposes of this invention are the aromatic amines produced on reacting aniline with formaldehyde. Specific aromatic amines falling within the scope of Formula XII are the following: 4,4'-diaminodiphenylmethane, 4,4' - diaminodiphenylsulfone, bis(4-amino-2-chlorophenyl)methane and the like.

In those instances in which a hardener is used, it is generally employed in amounts of about 40 percent of stoichiometric to about 60 percent in excess of stoichiometric. As a rule, it is prefererd to use about stoichiometric amounts.

Illustrative of suitable catalysts which can be used to initiate the self-cure of the epoxides of this invention are tertiary amines such as benzyldimethylamine and the like, quaternary ammonium compounds, boron trifluoride etherate complex, boron trifluoride monoethylamine complex and the like, uranyl nitrate, uranyl esters and the like.

In those instances wherein a catalyst is used, it is employed in at least catalytic amounts, that is, amounts sufficient to initiate the self-cure of the polyepoxides. Generally the catalyst is used in amounts of from about 0.2 to about 5 percent by weight and preferably from about 0.5 to about 2 percent by weight based on the weight of the polyepoxide. More than about 5 percent by weight of catalyst can be used but this does not materially decrease the time of the curing cycle and is, therefore, economically undesirable.

The polyepoxides of this invention can be used in every application now served by epoxies, as for example, in epoxy tooling and abrasive wheel applications, in electrical relays, gears and bearings. Also, the polyepoxides can be used in molding and casting applications to form shaped articles of desired form.

Particularly desirable applications of the polyepoxides of this invention are in the preparation of laminates and filament wound structures using aromatic amines as hardening agents. In producing a composition suitable for this purpose the polyepoxide in combination with an aromatic amine hardener is dissolved in any suitable organic solvent to form a solution having a solids content of about 30 to about 70 percent by weight. As a rule, the organic solvent used is a ketone, such as methyl ethyl ketone, diisopropyl ketone and the like. This solution is then used to impregnate, by any suitable method, for example, dipping, spraying and the like, any desired material, for instance, glass cloth, glass filaments, carbon cloth, carbon filaments, nylon filaments, metal fibers, paper and the like. The solvent is removed from the impregnated material and the impregnated material is then formed into a desired shape and the composition cured to its infusible state.

The temperature to which each impregnated material is heated in order to effect a cure of the composition will, of course, vary and depend, in part, upon the exact formulation of the composition. As a rule, this temperature is in the range of about 100° C. to about 200° C. for a period of time ranging from about 1 to 20 hours. In the production of laminates, it is also customary to subject the impregnated material to elevated pressures.

The following examples further illustrate the present invention and are not intended to limit the scope thereof in any manner.

EXAMPLE 1

This example illustrates the preparation of di-(2-cyclopentyl)anisole.

Six hundred thirty grams of di-2,4(2-cyclopentenyl)-phenol were charged into a five liter flask which contained 3000 ml. of acetone and 908 grams of methyl iodide and which was equipped with a mechanical agitator, thermometer, dropping funnel and cold water condenser. Thereafter, three hundred seventy nine grams of potassium hydroxide, in the form of pellets, were added to the flask while the mechanical agitator was operating. The reaction mixture was refluxed for 14 hours, cooled to about 25° C. and filtered. The filtrate was stripped at a temperature of 175° C. under a pressure of 50 mm. Hg leaving as the residue di-2,4(2-cyclopentenyl)-anisole. Di-2,4(2-cyclopentenyl)anisole was identified by liquid-vapor chromotographic analysis.

EXAMPLE 2

This example illustrates the preparation of tri-2,4,6(2-cyclopentenyl)anisole.

Example 1 was repeated using tri - 2,4,6(2 - cyclopentenyl)phenol, in the same equivalent amount, in lieu of di-(2-cyclopentenyl)phenol.

EXAMPLE 3

Di-(2-cyclopentenyl)anisole of Example 1 was epoxidized in a manner described in U.S. Patent 2,750,395 to B. Phillips et al. The crude product was molecularly distilled at a temperature of about 200° C. to 240° C. under a pressure of 8 to 320 microns Hg. The di-(2,3-epoxycyclopentenyl)anisole was a clear, yellow viscous liquid having an epoxy assay of 151.4 grams/gram equivalent.

EXAMPLE 4

Tri-(2-cyclopentenyl)anisole of Example 2 was epoxidized in a manner described in U.S. Patent 2,750,395 to B. Phillips et al. and molecularly distilled in a manner described in Example 2.

The tri-(2,3-epoxycyclopentyl)ansiole had an epoxy assay of 118 grams/gram equivalent.

EXAMPLE 5

This example illustrates the excellent storage life of the compounds of this invention.

Four hundred twenty grams of the epoxy of Example 3 and 84.2 grams of m-phenylenediamine were heated separately to a temperature of 100° C. and then admixed. A twenty gram sample of the mixture was poured into an ointment cup to a depth of ⅛ of an inch and allowed to stand at room temperature, about 23° C. At the end of nine months, the sample was virtually unchanged.

EXAMPLE 6

This example illustrates the excellent physical properties of the compounds of this invention.

Four hundred and twenty grams of the epoxy of Example 3 and 84.2 grams of m-phenylenediamine were heated separately to a temperature of 100° C., admixed and formed into castings which were cured and tested. The castings were cured by being subjected to the fol-
32 hours at 160° C.

40 hours at 100° C.
32 hours at 160° C.
6 hours at 200° C.

Properties of the cured castings are noted below.

Heat distortion temperature—187° C.
Compressive properties—(ASTMD-695-61)
Compressive modulus—774,000 p.s.i.
Compressive yield strength—32,300 p.s.i.
Compressive yield strength at 2 percent offset—32,200 p.s.i.
Compressive deformation—7.2 percent

What is claimed is:
1. Di-2,4-(2,3-epoxycyclopentyl)anisole.
2. Tri-2,4,6-(2,3-epoxycyclopentyl)anisole.

References Cited

UNITED STATES PATENTS 3,375,226    3/1968    Sellers et al. _____ 260—348

NORMA S. MILESTONE, Primary Examiner

U.S. Cl. X.R.

260—47, 612, 613

PO-1050
(5/69)

UNITED STATES PATENT OFFICE
CERTIFICATE OF CORRECTION

Patent No. 3,555,050               Dated January 12, 1971

Inventor(s) R. F. Sellers, et al

It is certified that error appears in the above-identified patent and that said Letters Patent are hereby corrected as shown below:

Column 1, line 61; "polyoxide" should read -- polyepoxid

Column 2, lines 65-70; Formula IV should read

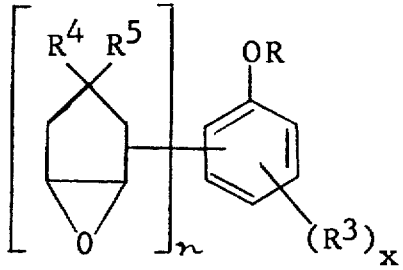

Column 3, line 35; "inclue" should read -- include --

Column 4, line 5; "Formvula" should read -- Formula --

Column 8, line 16; "32 hours at 160° C." should read -- lowing heating cycle --

Signed and sealed this 3rd day of August 1971.

(SEAL)
Attest:

EDWARD M. FLETCHER, JR.
Attesting Officer

WILLIAM E. SCHUYLER, JR
Commissioner of Patents